United States Patent
Zhao et al.

(10) Patent No.: US 9,206,300 B2
(45) Date of Patent: Dec. 8, 2015

(54) HIGH STRENGTH THERMOTROPIC LIQUID CRYSTALLINE POLYMER

(71) Applicant: Ticona LLC, Florence, KY (US)

(72) Inventors: Xinyu Zhao, Cincinnati, OH (US); Kamlesh Nair, Florence, KY (US); Paul Yung, Cincinnati, OH (US); Grant Barber, Baton Rouge, LA (US); Steven Gray, Florence, KY (US); Young Shin Kim, Erlanger, KY (US); Ardian Maliqi, Florence, KY (US)

(73) Assignee: Ticona LLC, Florence, KY (US)

( * ) Notice: Subject to any disclaimer, the term of this patent is extended or adjusted under 35 U.S.C. 154(b) by 0 days.

(21) Appl. No.: 14/297,011

(22) Filed: Jun. 5, 2014

(65) Prior Publication Data

US 2014/0364562 A1    Dec. 11, 2014

Related U.S. Application Data

(60) Provisional application No. 61/832,398, filed on Jun. 7, 2013.

(51) Int. Cl.
| | |
|---|---|
| C08G 18/42 | (2006.01) |
| C08K 7/14 | (2006.01) |
| C09K 19/38 | (2006.01) |
| C08G 67/02 | (2006.01) |
| C09K 19/52 | (2006.01) |

(52) U.S. Cl.
CPC ............... *C08K 7/14* (2013.01); *C09K 19/3809* (2013.01); *C09K 2019/521* (2013.01)

(58) Field of Classification Search
CPC ...................................................... C08K 7/14
USPC ........... 524/602; 528/176, 190, 193, 194, 196
See application file for complete search history.

(56) References Cited

U.S. PATENT DOCUMENTS

| | | |
|---|---|---|
| 4,002,600 A | 1/1977 | Habermeier |
| 4,038,416 A | 7/1977 | Mori et al. |
| 4,083,829 A | 4/1978 | Calundann et al. |
| 4,132,840 A | 1/1979 | Hugl et al. |
| 4,161,470 A | 7/1979 | Calundann et al. |
| 4,163,099 A | 7/1979 | Buxbaum et al. |
| 4,184,996 A | 1/1980 | Calundann |
| 4,219,461 A | 8/1980 | Calundann |
| 4,256,624 A | 3/1981 | Calundann |
| 4,279,803 A | 7/1981 | Calundann |
| 4,318,841 A | 3/1982 | East et al. |
| 4,330,457 A | 5/1982 | East et al. |
| 4,330,668 A | 5/1982 | Hideo et al. |
| 4,337,190 A | 6/1982 | Calundann |
| 4,339,375 A | 7/1982 | Calundann et al. |
| 4,351,917 A | 9/1982 | Calundann et al. |
| 4,351,918 A | 9/1982 | Charbonneau et al. |
| 4,355,132 A | 10/1982 | East et al. |
| 4,355,134 A | 10/1982 | Charbonneau et al. |
| 4,375,530 A | 3/1983 | Hay et al. |
| 4,387,210 A | 6/1983 | Katoh et al. |
| 4,393,191 A | 7/1983 | East |
| 4,421,908 A | 12/1983 | East |
| 4,429,105 A | 1/1984 | Charbonneau |
| 4,434,262 A | 2/1984 | Buckley et al. |
| 4,473,682 A | 9/1984 | Calundann et al. |
| 4,511,709 A | 4/1985 | Yoo et al. |
| 4,522,974 A | 6/1985 | Calundann et al. |
| 4,563,508 A | 1/1986 | Cottis et al. |
| 4,581,399 A | 4/1986 | Yoon |
| 4,603,190 A | 7/1986 | Dicke et al. |
| 4,611,025 A | 9/1986 | Akkapeddi et al. |
| 4,650,836 A | 3/1987 | George et al. |
| 4,751,128 A | 6/1988 | Portugall et al. |
| 4,778,858 A | 10/1988 | Ginnings |
| 4,831,104 A | 5/1989 | Aya et al. |
| 4,851,562 A | 7/1989 | de Jonge et al. |
| 4,904,752 A | 2/1990 | Kanoe et al. |
| 4,952,662 A | 8/1990 | Finke et al. |
| 4,968,737 A | 11/1990 | Finke et al. |
| 4,980,444 A | 12/1990 | de Jonge et al. |
| 4,980,504 A | 12/1990 | de Jonge et al. |
| 5,066,767 A | 11/1991 | Matzner et al. |
| 5,089,594 A | 2/1992 | Stern et al. |
| 5,093,464 A | 3/1992 | Yoon et al. |
| 5,102,935 A | 4/1992 | Heinz et al. |
| 5,120,820 A | 6/1992 | Fujiwara et al. |
| 5,147,967 A | 9/1992 | Stern et al. |
| 5,162,489 A | 11/1992 | de Jonge et al. |
| 5,171,823 A | 12/1992 | Charbonneau et al. |
| 5,204,417 A | 4/1993 | Stern et al. |
| 5,204,443 A | 4/1993 | Lee et al. |
| 5,216,091 A | 6/1993 | Stern et al. |
| 5,221,730 A | 6/1993 | Morris et al. |
| 5,237,038 A | 8/1993 | Morris et al. |

(Continued)

FOREIGN PATENT DOCUMENTS

| | | |
|---|---|---|
| JP | 2003040989 A | 2/2003 |
| JP | 2004018607 A | 1/2004 |

(Continued)

OTHER PUBLICATIONS

International Search Report and Written Opinion for PCT/US2014/041020 dated Sep. 9, 2014, 8 pages.

*Primary Examiner* — Terressa Boykin

(74) *Attorney, Agent, or Firm* — Dority & Manning, P.A.

(57) ABSTRACT

A wholly aromatic thermotropic liquid crystalline polymer and compositions including the liquid crystalline polymer are described. The polymer composition can include the liquid crystalline polymer and a fibrous filler, e.g., a chopped glass or milled glass fibrous filler. The compositions are capable of exhibiting excellent mechanical properties. The liquid crystalline polymer provides desirable characteristics with the incorporation of little or no naphthenic acids in the polymer backbone.

27 Claims, 4 Drawing Sheets

(56) References Cited

U.S. PATENT DOCUMENTS

| | | |
|---|---|---|
| 5,258,470 A | 11/1993 | Poll et al. |
| 5,271,865 A | 12/1993 | Hittich et al. |
| 5,278,278 A | 1/1994 | Okamoto et al. |
| 5,296,542 A | 3/1994 | Layton et al. |
| 5,298,593 A | 3/1994 | Fujiwara et al. |
| 5,324,795 A | 6/1994 | Suenaga |
| 5,334,343 A | 8/1994 | Po' et al. |
| 5,352,746 A | 10/1994 | Asai et al. |
| 5,391,688 A | 2/1995 | Mazaki et al. |
| 5,399,656 A | 3/1995 | Nitta et al. |
| 5,446,124 A | 8/1995 | Niwano et al. |
| 5,480,907 A | 1/1996 | Hayashi et al. |
| 5,496,893 A | 3/1996 | Gagné et al. |
| 5,500,294 A | 3/1996 | Sakumoto et al. |
| 5,510,189 A | 4/1996 | Sakumoto et al. |
| 5,534,187 A | 7/1996 | Miyazawa et al. |
| 5,541,240 A | 7/1996 | Makhija et al. |
| 5,541,267 A | 7/1996 | Akkapeddi et al. |
| 5,563,216 A | 10/1996 | Niwano et al. |
| 5,573,752 A | 11/1996 | Ranganathan et al. |
| 5,609,956 A | 3/1997 | Sakumoto et al. |
| 5,614,316 A | 3/1997 | Hashimoto et al. |
| 5,616,680 A | 4/1997 | Linstid, III |
| 5,663,276 A | 9/1997 | Yoneta et al. |
| 5,766,507 A | 6/1998 | Nakai |
| 5,767,223 A | 6/1998 | Yamada et al. |
| 5,779,936 A | 7/1998 | Miyazawa et al. |
| 5,976,406 A | 11/1999 | Nagano et al. |
| 5,997,765 A | 12/1999 | Furuta et al. |
| 6,046,300 A | 4/2000 | Umetsu et al. |
| 6,114,492 A | 9/2000 | Linstid, III et al. |
| 6,140,455 A | 10/2000 | Nagashima et al. |
| 6,177,500 B1 | 1/2001 | Okamoto et al. |
| 6,268,419 B1 | 7/2001 | Murouchi et al. |
| 6,294,618 B1 | 9/2001 | Soelch |
| 6,294,643 B1 | 9/2001 | Harada et al. |
| 6,296,930 B1 | 10/2001 | Ohbe et al. |
| 6,296,950 B2 | 10/2001 | Murouchi et al. |
| 6,312,772 B1 | 11/2001 | Kuder et al. |
| 6,333,393 B1 | 12/2001 | Harada |
| 6,376,076 B1 | 4/2002 | Ohbe et al. |
| 6,498,274 B1 | 12/2002 | Brown et al. |
| 6,512,079 B2 | 1/2003 | Okamoto et al. |
| 6,514,611 B1 | 2/2003 | Shepherd et al. |
| 6,582,625 B2 | 6/2003 | Nagashima et al. |
| 6,613,847 B2 | 9/2003 | Soelch |
| 6,649,730 B2 | 11/2003 | Okamoto et al. |
| 6,656,386 B2 | 12/2003 | Suenaga et al. |
| 6,680,002 B2 | 1/2004 | Yamauchi et al. |
| 6,702,956 B2 | 3/2004 | Maeda et al. |
| 6,740,728 B2 | 5/2004 | Ding et al. |
| 6,755,992 B2 | 6/2004 | Okamoto et al. |
| 6,867,280 B2 | 3/2005 | Okamoto et al. |
| 7,014,921 B2 | 3/2006 | Okamoto et al. |
| 7,179,401 B2 | 2/2007 | Ueno et al. |
| 7,238,714 B2 | 7/2007 | Nakao et al. |
| 7,335,318 B2 | 2/2008 | Asahara et al. |
| 7,343,675 B2 | 3/2008 | Smith et al. |
| 7,344,657 B2 | 3/2008 | Okamoto et al. |
| 7,393,467 B2 | 7/2008 | Asahara et al. |
| 7,405,250 B2 | 7/2008 | Kim |
| 7,507,784 B2 | 3/2009 | Dingemans et al. |
| 7,534,914 B2 | 5/2009 | Koike et al. |
| 7,550,093 B2 | 6/2009 | Seo et al. |
| 7,592,413 B2 | 9/2009 | Citron et al. |
| 7,648,748 B2 | 1/2010 | Nakane et al. |
| 7,754,717 B2 | 7/2010 | Dimauro et al. |
| 7,759,344 B2 | 7/2010 | Booker et al. |
| 7,790,055 B2 | 9/2010 | Murouchi et al. |
| 7,790,793 B2 | 9/2010 | Schmidt et al. |
| 7,795,315 B2 | 9/2010 | Chen et al. |
| 7,803,307 B2 | 9/2010 | Zimmerman |
| 7,816,014 B2 | 10/2010 | Oto et al. |
| 7,824,572 B2 | 11/2010 | Okamoto |
| 7,825,176 B2 | 11/2010 | Kim et al. |
| 7,914,699 B2 | 3/2011 | Tachikawa et al. |
| 8,034,255 B2 | 10/2011 | Goldfinger |
| 8,084,476 B2 | 12/2011 | Koike et al. |
| 8,084,637 B2 | 12/2011 | Chopra et al. |
| 8,142,683 B2 | 3/2012 | Murouchi et al. |
| 8,309,734 B2 | 11/2012 | Bissantz et al. |
| 8,383,759 B2 | 2/2013 | Ohtomo et al. |
| 8,440,780 B2 | 5/2013 | Hamaguchi et al. |
| 8,492,500 B2 | 7/2013 | Hosoda et al. |
| 8,501,897 B2 | 8/2013 | Hosoda et al. |
| 8,609,802 B2 | 12/2013 | Kim et al. |
| 8,759,474 B2 | 6/2014 | Ohtomo et al. |
| 8,852,730 B2 | 10/2014 | Nair et al. |
| 8,906,258 B2 | 12/2014 | Gray et al. |
| 8,916,673 B2 | 12/2014 | Miyauchi et al. |
| 9,012,593 B2 | 4/2015 | Chang et al. |
| 2004/0135118 A1 | 7/2004 | Waggoner |
| 2006/0019110 A1 | 1/2006 | Sato et al. |
| 2006/0073306 A1 | 4/2006 | Nakane et al. |
| 2007/0106035 A1 | 5/2007 | Gomurashvili et al. |
| 2007/0185118 A1 | 8/2007 | Hooft Van Huijsduijnene et al. |
| 2007/0232594 A1 | 10/2007 | Yokoyama et al. |
| 2009/0001317 A1 | 1/2009 | Okamoto |
| 2009/0111950 A1 | 4/2009 | Yamazaki et al. |
| 2009/0275697 A1 | 11/2009 | Waggoner et al. |
| 2010/0130743 A1 | 5/2010 | Wada et al. |
| 2011/0071304 A1 | 3/2011 | Fujimaki et al. |
| 2011/0184188 A1 | 7/2011 | Wada et al. |
| 2012/0022202 A1 | 1/2012 | Suh et al. |
| 2012/0095183 A1 | 4/2012 | Chang et al. |
| 2012/0329975 A1 | 12/2012 | Hosoda et al. |
| 2013/0048908 A1* | 2/2013 | Gray et al. .............. 252/299.5 |
| 2013/0048909 A1 | 2/2013 | Nair et al. |
| 2013/0048910 A1 | 2/2013 | Nair et al. |
| 2013/0048911 A1 | 2/2013 | Nair et al. |
| 2013/0048914 A1 | 2/2013 | Nair et al. |
| 2013/0052447 A1 | 2/2013 | Grenci et al. |
| 2013/0053531 A1 | 2/2013 | Nair et al. |
| 2013/0053532 A1 | 2/2013 | Nair et al. |
| 2013/0053533 A1 | 2/2013 | Nair et al. |
| 2013/0062558 A1 | 3/2013 | Nair et al. |
| 2013/0197165 A1 | 8/2013 | Ohtomo et al. |
| 2013/0270481 A1 | 10/2013 | Miyamoto et al. |
| 2013/0331540 A1 | 12/2013 | Kim et al. |
| 2014/0088287 A1 | 3/2014 | Nishimura et al. |
| 2014/0256903 A1 | 9/2014 | Kawahara et al. |
| 2015/0038631 A1 | 2/2015 | Hamaguchi et al. |

FOREIGN PATENT DOCUMENTS

| | | |
|---|---|---|
| JP | 2004256656 A | 9/2004 |
| JP | 2004352862 A | 12/2004 |
| JP | 2011178936 A | 9/2011 |
| JP | 5098168 B2 | 12/2012 |
| KR | 20130012509 A | 2/2013 |
| WO | WO 2013/074467 | 5/2013 |

* cited by examiner

HIGH STRENGTH THERMOTROPIC LIQUID CRYSTALLINE POLYMER

BACKGROUND OF THE INVENTION

Thermotropic liquid crystalline polymers are wholly aromatic condensation polymers that have relatively rigid and linear polymer chains. When these polymers melt they orient to form a liquid crystal phase. The formulations are generally derived from aromatic hydroxy acid monomers (e.g., hydroxybenzoic acid ("HBA") or 6-hydroxy-2-naphthenic acid ("HNA")), either alone or in conjunction with other aromatic monomers, such as diacids (e.g., terephthalic acid ("TA") or isophthalic acid ("IA")) and/or dials (e.g., hydroquinone ("HQ"), acetaminophen ("APAP"), and 4,4'-biphenol ("BP")). Liquid crystalline polymers make up a family of thermoplastics that have a unique set of properties. They perform very well in harsh environments, exhibiting high heat resistance and tolerance, high electrical resistance, and high chemical resistance. Although liquid crystalline polymers have many unique advantages, they also have shown disadvantages. For instance, the strength characteristics exhibited by liquid crystalline polymers are often not adequate for certain applications such as thin-walled portions of electrical connectors, printer parts, etc. Moreover, as the demand grows for small and light products, polymers that exhibit adequate mechanical characteristics are being sought as replacement for heavier metal materials, for instance as framing for portable electronics.

Efforts have been made to improve the physical characteristics of liquid crystalline polymers through various means including the formation of blends with other polymers, the introduction of certain fillers into the liquid crystalline polymer composition such as specific amounts of inorganic fillers, the inclusion of small molecules or oligomers into a blend, the incorporation of additional monomer units into the polymer backbone as a repeating unit, and so forth. One commonly employed method for improving physical characteristics of liquid crystalline polymers is through incorporation of a naphthenic acid chain disrupter into the polymer backbone. For instance, HNA has been incorporated into the polymer, and is generally believed to disrupt the linear nature of the polymer backbone and thereby affect characteristics of the polymer, such as melting temperature. Unfortunately, the utilization of naphthenic acid derivatives as a chain disrupter can lead to other less desirable results. For instance, reactivity of the naphthenic acids with other monomeric constituents can occur and may have unintended consequences on the final properties of the polymer composition. Moreover, high amounts of naphthenic chain disrupters can lead to a lower level of molecular orientation, which can affect mechanical properties. In addition to functional concerns, the high cost of naphthenic acids alone dictates that the need for avoidance of these materials.

As such, a need continues to exist for a thermotropic liquid crystalline polymer that exhibits desired mechanical characteristics while avoiding undesired issues as have been encountered in the past.

SUMMARY OF THE INVENTION

In accordance with one embodiment of the present invention, a thermotropic liquid crystalline polymer composition is disclosed that comprises a melt-polymerized, wholly aromatic liquid crystalline polymer and a fibrous filler. For instance, the total amount of repeating units in the liquid crystalline polymer derived from naphthenic acids can be no more than about 5 mol. %. In addition, the repeating units in the liquid crystalline polymer include units derived from isophthalic acid, from hydroquinone, and from at least one hydroxycarboxylic acid. In addition, the polymer composition can have a flexural modulus of greater than about 10,000 megaPascals as determined in accordance with ISO Test No. 178 at 23° C.

Other features and aspects of the present invention are set forth in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which.

DETAILED DESCRIPTION

Figure 1:
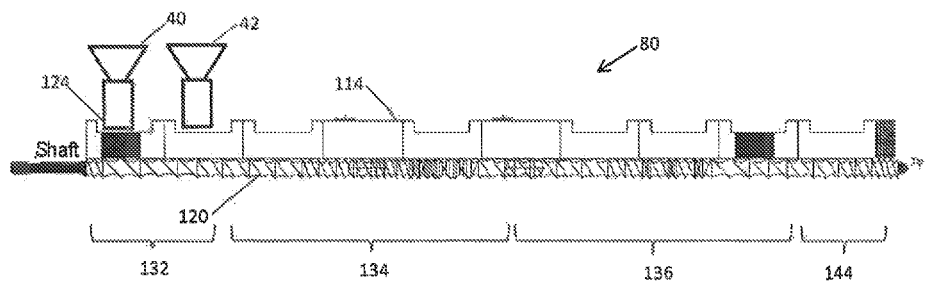
FIG. 1 illustrates an extruder that may be utilized in forming the liquid crystalline polymer.

It is to be understood by one of ordinary skill in the art that the present discussion is a description of exemplary embodiments only, and is not intended as limiting the broader aspects of the present invention.

Generally speaking, the present invention is directed to a wholly aromatic thermotropic liquid crystalline polymer and compositions including the liquid crystalline polymer capable of exhibiting excellent mechanical properties. For instance, the polymer composition can include the liquid crystalline polymer and a fibrous filler. Beneficially, the liquid crystalline polymer provides desirable characteristics with the incorporation of little or no naphthenic acids in the polymer backbone. For instance, a composition incorporating the liquid crystalline polymer may exhibit excellent tensile modulus and flexural modulus characteristics, which may be considered a measure of the overall stiffness of the polymer composition. By way of example, a polymer composition can have a tensile modulus of greater than about 10,000 MPa, greater than about 16,000 MPa, greater than about 18,000 MPa, greater than about 20,000 MPa, or greater than about 22,000 MPa as determined according to ISO Test No. 527 (technically equivalent to ASTM D638) at a temperature of 23° C. The polymer composition can also have flexural strength of greater than about 16,000 MPa, greater than about 19,000 MPa, greater than about 21,000 MPa, or greater than about 23,000 MPa as determined according to ISO Test No. 178 (technically equivalent to ASTM D790) at a temperature of 23° C.

The ability to form a polymer with the properties noted above may be achieved by the use of isophthalic acid and hydroquinone on the polymer backbone in conjunction with the polymer having little or no naphthenic acid derivatives. More specifically, the liquid crystalline polymer can utilize isophthalic acid and hydroquinone in place of conventional naphthenic acid chain disrupters (e.g., HNA) utilized in the past. For instance, the isophthalic acid and hydroquinone can be utilized in a ratio to one another of from about 2:1 to about 1:2, from about 3:2 to about 2:3 or from about 4:5 to about 5:4. In one embodiment, the isophthalic acid and the hydroquinone can be utilized in a ratio to one another of about 1:1. Without wishing to be bound to any particular theory, it is believed that through utilization of a combination of isophthalic acid and hydroquinone rather than a naphthenic acid chain disruptor, the linearity of the polymer can be increased, which can improve the strength characteristics of the polymer.

The precursor monomers employed during the formation of the liquid crystalline polymer can include the isophthalic acid and the hydroquinone in addition to one or more additional precursor monomers. The additional precursor monomer employed may generally vary as is known in the art. For example, suitable thermotropic liquid crystalline polymers may be aromatic polyesters, aromatic poly(esteramides), aromatic poly(estercarbonates), aromatic polyamides, etc., and as such contain repeating units formed from one or more aromatic hydroxycarboxylic acids, aromatic dicarboxylic acids, aromatic dials, aromatic aminocarboxylic acids, aromatic amines, aromatic diamines, etc., as well as combinations thereof in conjunction with the isophthalic acid and the hydroquinone.

In general, the monomer units derived from hydroquinone may constitute from about 1 mol. % to about 25 mol. %, in some embodiments from about 2 mol. % to about 20 mol. %, and in some embodiments, from about 2 mol. % to about 18 mol. % of the polymer. The monomer units derived from isophthalic acid may constitute from about 1 mol. % to about 30 mol. %, in some embodiments from about 2 mol. % to about 25 mol. %, and in some embodiments, from about 2 mol. % to about 23 mol. % of the polymer. The remainder monomer units of the polymer can be derived from additional precursor monomers as are generally known in the art.

Aromatic polyesters, for instance, may be obtained by polymerizing hydroquinone and isophthalic acid in conjunction with at least one aromatic hydroxycarboxylic acid. The aromatic polyester may optionally include additional diols and/or dicarboxylic acids, as are known. Examples of suitable aromatic hydroxycarboxylic acids include 4-hydroxybenzoic acid; 4-hydroxy-4'-biphenylcarboxylic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof.

Examples of aromatic dicarboxylic acids include terephthalic acid; 2,6-naphthalenedicarboxylic acid; diphenyl ether-4,4'-dicarboxylic acid; 1,6-naphthalenedicarboxylic acid; 2,7-naphthalenedicarboxylic acid; 4,4'-dicarboxybiphenyl; bis(4-carboxyphenyl)ether; bis(4-carboxyphenyl) butane; bis(4-carboxyphenyl)ethane; bis(3-carboxyphenyl) ether; bis(3-carboxyphenyl)ethane, etc., as well as alkyl, alkoxy, aryl and halogen substituents thereof. Examples of aromatic diols include resorcinol; 4,4'-dihydroxybiphenyl; 3,3'-dihydroxybiphenyl; 3,4'-dihydroxybiphenyl; 4,4'-dihydroxybiphenyl ether; bis(4-hydroxyphenyl)ethane, etc., as well as alkyl, alkoxy, aryl and halogen substituents thereof.

Liquid crystalline polyesteramides may likewise be obtained by polymerizing the isophthalic acid and hydroquinone with at least one aromatic aminocarboxylic acid and/or at least one aromatic amine and/or diamine optionally having phenolic hydroxy groups. The liquid crystalline polyesteramide may also incorporate one or more additional aromatic hydroxycarboxylic acid and/or aromatic dicarboxylic acid as described above. Suitable aromatic amines and diamines may include, for instance, 3-aminophenol; 4-aminophenol; 1,4-phenylenediamine; 1,3-phenylenediamine, etc., as well as alkyl, alkoxy, aryl and halogen substituents thereof. For example, a liquid crystalline polyesteramide can be obtained by polymerizing isophthalic acid, hydroquinone, and N-acetyl-4-aminophenol (commonly termed APAP or acetaminophen) with a hydroxycarboxylic acid, optionally in conjunction with one or more additional monomeric constituents as described.

While not necessarily required in all embodiments, it is generally desired to minimize the content of repeating units derived from hydroxynaphthenic acids, such as 6-hydroxy-2-naphthenic acid (HNA). That is, the total amount of repeating units derived from hydroxynaphthenic acids is typically no more than about 5 mol. %, in some embodiments no more than about 3 mol. %, and in some embodiments, from 0 mol. % to about 2 mol. % (e.g., 0 mol. %) of the polymer. Likewise, of the precursor monomer(s) employed during melt polymerization, no more than about 5 mol. %, in some embodiments no more than about 3 mol. %, and in some embodiments, from 0 mol. % to about 2 mol. % (e.g., 0 mol. %) are hydroxynaphthenic acids. In one embodiment, the liquid crystalline polymer will not include any hydroxynaphthenic acid monomers in the backbone.

The liquid crystalline polymer can be formed with a minimum amount of repeating units derived from naphthenic dicarboxylic acids. For instance, the total amount of repeating units derived from naphthenic hydroxycarboxylic and/or dicarboxylic acids (e.g., NDA, HNA, or a combination of HNA and NDA) can be no more than about 5 mol. %, in some embodiments no more than about 3 mol. %, and in some embodiments, from 0 mol. % to about 2 mol. % (e.g., 0 mol. %) of the polymer. For instance, of the precursor monomer(s) employed during melt polymerization, there may be no naphthenic hydroxycarboxylic acids and no more than about 5 mol. %, in some embodiments no more than about 3 mol. %, and in some embodiments, from 0 mol. % to about 2 mol. % (e.g., 0 mol. %) may be naphthenic dicarboxylic acids.

Despite the absence of a high level of conventional naphthenic acids, it is believed that the resulting "low naphthenic" polymers are still capable of exhibiting good heat resistance at a lower melting temperature while exhibiting excellent mechanical characteristics. In one embodiment, a liquid crystalline esteramide is derived from isophthalic acid, hydroquinone, a hydroxycarboxylic acid and N-acetyl-4-aminophenol. Other monomeric units may optionally be employed such as other aromatic hydroxy carboxylic acids (e.g., terephthalic acid) and/or aromatic diols (e.g., 4,4'-biphenol, resorcinol, etc.). Terephthalic acid may, for example, constitute from about 1 mol. % to about 25 mol. %, in some embodiments from about 2 mol. % to about 20 mol. %, and in some embodiments, from about 5 mol. % to about 15 mol. % of the polymer. Resorcinol and/or 4,4'-biphenol may likewise constitute from about 1 mol. % to about 15 mol. %, when employed.

In one particular embodiment, a liquid crystalline esteramide is derived from isophthalic acid, hydroquinone, 4-hydroxybenzoic acid, terephthalic acid, 4,4'-dihydroxybiphenyl, and N-acetyl-4-aminophenol. The monomer units derived from isophthalic acid may constitute from about 1% to about 5% of the polymer on a mole basis (e.g., 2%-3%), the monomer units derived from hydroquinone may constitute from about 1% to about 5% of the polymer on a mole basis (e.g., 2%-3%), the monomer units derived from 4-hydroxybenzoic acid may constitute from about 30% to about 90% of the polymer on a mole basis (e.g., 50%-70%), the monomer units derived from terephthalic acid may constitute from about 5% to about 50% (e.g., 20%) of the polymer on a mole basis, the monomer units derived from 4-4'-dihydroxybiphenyl may constitute from about 1% to about 20% of the polymer on a mole basis (e.g., 5%-15%), and the monomer units derived from N-acetyl-4-aminophenol may constitute from about 2% to about 15% (e.g., 5%-10%) of the polymer on a mole basis.

Regardless of their additional constituents, the liquid crystalline polymers may be prepared by introducing the appropriate monomer(s) (e.g., hydroquinone, isophthalic acid, aromatic hydroxycarboxylic acid, aromatic dicarboxylic acid, aromatic dial, aromatic amine, aromatic diamine, etc.) into a reactor vessel to initiate a polycondensation reaction. The vessel employed for the reaction is not especially limited, although it is typically desired to employ one that is commonly used in reactions of high viscosity fluids. Examples of such a reaction vessel may include a stirring tank-type apparatus that has an agitator with a variably-shaped stirring blade, such as an anchor type, multistage type, spiral-ribbon type, screw shaft type, etc., or a modified shape thereof. Further examples of such a reaction vessel may include a mixing apparatus commonly used in resin kneading, such as a kneader, a roll mill, a Banbury mixer, etc.

If desired, the reaction may proceed through the acetylation of the monomers as referenced above and known the art. This may be accomplished by adding an acetylating agent (e.g., acetic anhydride) to the monomers. Acetylation is generally initiated at temperatures of about 90° C. During the initial stage of the acetylation, reflux may be employed to maintain vapor phase temperature below the point at which acetic acid byproduct and anhydride begin to distill. Temperatures during acetylation typically range from between 90° C. to 150° C., and in some embodiments, from about 110° C. to about 150° C. If reflux is used, the vapor phase temperature typically exceeds the boiling point of acetic acid, but remains low enough to retain residual acetic anhydride. For example, acetic anhydride vaporizes at temperatures of about 140° C. Thus, providing the reactor with a vapor phase reflux at a temperature of from about 110° C. to about 130° C. is particularly desirable. To ensure substantially complete reaction, an excess amount of acetic anhydride may be employed. The amount of excess anhydride will vary depending upon the particular acetylation conditions employed, including the presence or absence of reflux. The use of an excess of from about 1 to about 10 mole percent of acetic anhydride, based on the total moles of reactant hydroxyl groups present is not uncommon.

Acetylation may occur in a separate reactor vessel, or it may occur in situ within the polymerization reactor vessel. When separate reactor vessels are employed, one or more of the monomers may be introduced to the acetylation reactor and subsequently transferred to the polymerization reactor. Likewise, one or more of the monomers may also be directly introduced to the reactor vessel without undergoing pre-acetylation. In addition to the monomers and optional acetylating agents, other materials may also be included within the reaction mixture to help facilitate polymerization. For instance, a catalyst may be optionally employed, such as metal salt catalysts (e.g., magnesium acetate, tin(I) acetate, tetrabutyl titanate, lead acetate, sodium acetate, potassium acetate, etc.) and organic compound catalysts (e.g., N-methylimidazole). Such catalysts are typically used in amounts of from about 50 to about 500 parts per million based on the total weight of the recurring unit precursors. When separate reactors are employed, it is typically desired to apply the catalyst to the acetylation reactor rather than the polymerization reactor, although this is by no means a requirement.

The reaction mixture is generally heated to an elevated temperature within the polymerization reactor vessel to initiate melt polycondensation of the reactants. Polycondensation may occur, for instance, within a temperature range of from about 210° C. to about 400° C., and in some embodiments, from about 250° C. to about 350° C. For instance, one suitable technique for forming an aromatic polyester may include charging precursor monomers (e.g., hydroquinone and isophthalic acid in conjunction with one or more additional monomers) and acetic anhydride into the reactor, heating the mixture to a temperature of from about 90° C. to about 150° C. to acetylize a hydroxyl group of the monomers (e.g., forming acetoxy), and then increasing the temperature to a temperature of from about 210° C. to about 400° C. to carry out melt polycondensation. As the final polymerization temperatures are approached, volatile byproducts of the reaction (e.g., acetic acid) may also be removed so that the desired molecular weight may be readily achieved. The reaction mixture is generally subjected to agitation during polymerization to ensure good heat and mass transfer, and in turn, good material homogeneity. The rotational velocity of the agitator may vary during the course of the reaction, but typically ranges from about 10 to about 100 revolutions per minute ("rpm"), and in some embodiments, from about 20 to about 80 rpm. To build molecular weight in the melt, the polymerization reaction may also be conducted under vacuum, the application of which facilitates the removal of volatiles formed during the final stages of polycondensation. The vacuum may be created by the application of a suctional pressure, such as within the range of from about 5 to about 30 pounds per square inch ("psi"), and in some embodiments, from about 10 to about 20 psi.

Following melt polymerization; the molten polymer may be discharged from the reactor, typically through an extrusion orifice fitted with a die of desired configuration, cooled, and collected. Commonly, the melt is discharged through a perforated die to form strands that are taken up in a water bath, pelletized and dried. The resin may also be in the form of a strand, granule, or powder. While unnecessary, it should also be understood that a subsequent solid phase polymerization may be conducted to further increase molecular weight. When carrying out solid-phase polymerization on a polymer obtained by melt polymerization, it is typically desired to select a method in which the polymer obtained by melt polymerization is solidified and then pulverized to form a powdery or flake-like polymer, followed by performing solid polymerization method, such as a heat treatment in a temperature range of 200° C. to 350° C. under an inert atmosphere (e.g., nitrogen).

Regardless of the particular method employed, the resulting liquid crystalline polymer typically has a number average molecular weight (Mn) of about 2,000 grams per mole or more, in some embodiments from about 4,000 grams per mole or more, and in some embodiments, from about 5,000 to about 30,000 grams per mole, Of course, it is also possible to form polymers having a lower molecular weight, such as less than about 2,000 grams per mole, using the method of the present invention. The intrinsic viscosity of the polymer, which is generally proportional to molecular weight, may likewise be about 2 deciliters per gram ("dL/g") or more, in some embodiments about 3 dL/g or more, in some embodiments from about 4 to about 20 dL/g, and in some embodiments from about 5 to about 15 dL/g. Intrinsic viscosity may be determined in accordance with ISO-1628-5 using a 50/50 (v/v) mixture of pentafluorophenol and hexafluoroisopropanol. According to this method, each sample is prepared in duplicate by weighing about 0.02 grams into a 22 mL vial. 10 mL of pentafluorophenol ("PFP") is added to each vial and the solvent. The vials are placed in a heating block set to 80°

C. overnight. The following day 10 mL of hexafluoroisopropanol ("HFIP") is added to each vial. The final polymer concentration of each sample is generally about 0.1%. The samples are allowed to cool to room temperature and analyzed using viscometer, for instance a PolyVisc automatic viscometer.

In forming a polymer composition, the liquid crystalline polymer is combined with a fibrous filler. The fibrous filler may include one or more fiber types including, without limitation, polymer fibers, glass fibers, carbon fibers, metal fibers, natural fibers such as jute, bamboo, etc., basalt fibers, and so forth, or a combination of fiber types. The total amount of fibrous fillers may, for example, constitute from about 10 wt. % to about 90 wt. %, in some embodiments from about 20 wt. % to about 60 wt. %, and in some embodiments, from about 25 wt. % to about 55 wt. % of the composition.

The fibers used in the polymer composition generally have a high degree of tensile strength relative to their mass. For example, the ultimate tensile strength of the fibers (determined in accordance with ASTM D2101) is typically from about 1,000 to about 15,000 megaPascals ("MPa"), in some embodiments from about 2,000 MPa to about 10,000 MPa, and in some embodiments, from about 3,000 MPa to about 6,000 MPa. To help maintain an insulative property, which is often desirable when employed in electrical components, the high strength fibers may be formed from materials that are also generally insulative in nature, such as glass, ceramics (e.g., alumina or silica), aramids (e.g., Kevlar® marketed by E. I. duPont de Nemours, Wilmington, Del.), polyolefins, polyesters, etc., as well as mixtures thereof. Glass fibers are particularly suitable, such as E-glass, A-glass, C-glass, D-glass, AR-glass, R-glass, S1-glass, S2-glass, etc., and mixtures thereof.

The average length of the fibers in the polymer composition may vary. For instance, in one embodiment, chopped fibers, e.g., chopped glass fibers can be utilized having an initial length of from about 1 millimeter to about 20 millimeters, from about 2 millimeters to about 10 millimeters, or from about 3 millimeters to about 6 millimeters. The nominal diameter of the chopped glass fibers can generally be from about 2 micrometers to about 50 micrometers, for instance from about 5 micrometers to about 20 micrometers.

Milled glass fibers may be utilized as a fibrous filler for the polymer composition, either in combination with chopped fibers or alternative to chopped fibers. The milled fibers may, for example, have a length of from about 10 micrometers to about 200 micrometers or from about 20 micrometers to about 75 micrometers.

The nominal diameter of the fibers, including both chopped and milled fibers, can generally be from about 10 micrometers to about 35 micrometers, and in some embodiments, from about 15 micrometers to about 30 micrometers. In one embodiment, the fibers may have a relatively high aspect ratio (average length divided by nominal diameter). For example, the fibers may have an aspect ratio of from about 2 to about 50, in some embodiments from about 4 to about 40, and in some embodiments from about 5 to about 20 are particularly beneficial.

The fibers may be pretreated with a sizing as is generally known. In one embodiment, the fibers may have a high yield or small K numbers. The tow is indicated by the yield or K number. For instance, glass fiber tows may have 50 yield and up, for instance from about 115 yield to about 1200 yield.

In addition to the fibers noted above, other additives that can be included in the composition may include, for instance, antimicrobials, fillers, pigments, antioxidants, stabilizers, surfactants, waxes, flow promoters, solid solvents, and other materials added to enhance properties and processability. For instance, mineral fillers may be employed in the polymer composition to help achieve a smooth surface appearance. When employed, such mineral fillers typically constitute from about 1 wt. % to about 40 wt. %, in some embodiments from about 2 wt. % to about 35 wt. %, and in some embodiments, from about 5 wt. % to about 30 wt. % of the polymer composition. Clay minerals may be particularly suitable for use in the present invention. Examples of such clay minerals include, for instance, talc ($Mg_3Si_4O_{10}(OH)_2$), halloysite ($Al_2Si_2O_5(OH)_4$), kaolinite ($Al_2Si_2O_5(OH)_4$), illite (($K, H_3O)(Al,Mg,Fe)_2(Si,Al)_4O_{10}[(OH)_2,(H_2O)]$), montmorillonite ($(Na,Ca)_{0.33}(Al,Mg)_2Si_4O_{10}(OH)_2 \cdot nH_2O$), vermiculite (($(MgFe,Al)_3(Al,Si)_4O_{10}(OH)_2 \cdot 4H_2O$), palygorskite (($Mg, Al)_2Si_4O_{10}(OH) \cdot 4(H_2O)$)), pyrophyllite ($Al_2Si_4O_{10}(OH)_2$), etc., as well as combinations thereof. In lieu of, or in addition to, clay minerals, still other mineral fillers may also be employed. For example, other suitable silicate fillers may also be employed, such as calcium silicate, aluminum silicate, aluminum hydroxide (alumina trihydrate (ATH)), mica, diatomaceous earth, wollastonite, and so forth. Mica, for instance, may be particularly suitable. There are several chemically distinct mica species with considerable variance in geologic occurrence, but all have essentially the same crystal structure. As used herein, the term "mica" is meant to generically include any of these species, such as muscovite ($KAl_2(AlSi_3)O_{10}(OH)_2$), biotite ($K(Mg,Fe)_3(AlSi_3)O_{10}(OH)_2$), phlogopite ($KMg_3(AlSi_3)O_{10}(OH)_2$), lepidolite ($K(Li,Al)_{2-3}(AlSi_3)O_{10}(OH)_2$), glauconite ($(K,Na)(Al,Mg,Fe)_2(Si,Al)_4O_{10}(OH)_2$), etc., as well as combinations thereof.

Lubricants that are capable of withstanding the processing conditions of the liquid crystalline polymer without substantial decomposition may also be employed in the polymer composition. Examples of such lubricants include fatty acids esters, the salts thereof, esters, fatty acid amides, organic phosphate esters, and hydrocarbon waxes of the type commonly used as lubricants in the processing of engineering plastic materials, including mixtures thereof. Suitable fatty acids typically have a backbone carbon chain of from about 12 to about 60 carbon atoms, such as myristic acid, palmitic acid, stearic acid, arachic acid, montanic acid, octadecanoic acid, parinaric acid, and so forth. Suitable esters include fatty acid esters, fatty alcohol esters, wax esters, glycerol esters, glycol esters and complex esters, Fatty acid amides include fatty primary amides, fatty secondary amides, methylene and ethylene bisamides and alkanolamides such as, for example, palmitic acid amide, stearic acid amide, oleic acid amide, N,N'-ethylenebisstearamide and so forth. Also suitable are the metal salts of fatty adds such as calcium stearate, zinc stearate, magnesium stearate, and so forth; hydrocarbon waxes, including paraffin waxes, polyolefin and oxidized polyolefin waxes, and microcrystalline waxes. Particularly suitable lubricants are adds, salts, or amides of stearic acid, such as pentaerythritol tetrastearate, calcium stearate, or N,N'-ethylenebisstearamide. When employed, the lubricant(s) typically constitute from about 0.05 wt. % to about 1.5 wt. %, and in some embodiments, from about 0.1 wt. % to about 0.5 wt. % (by weight) of the polymer composition.

The polymer composition can also include additives that can allow the composition to be used in a particular application and/or processed according to a particular method. For instance, in one embodiment, the polymer composition can include a laser activatable additive and as such the formed polymer composition can be "laser activatable" in the sense that it contains an additive that is activated by a laser direct structuring ("LDS") process. In such a process, the additive is exposed to a laser that causes the release of metals. The laser thus can be used to draw a pattern of conductive elements onto an article formed of the polymer composition and can leave behind a roughened surface containing embedded metal particles. These particles act as nuclei for the crystal growth during a subsequent plating process (e.g., copper plating, gold plating, nickel plating, silver plating, zinc plating, tin plating, etc).

The laser activatable additive generally includes spinel crystals, which may include two or more metal oxide cluster configurations within a definable crystal formation. For example, the overall crystal formation may have the following general formula:

$$AB_2O_4$$

wherein,

A is a metal cation having a valence of 2, such as cadmium, manganese, nickel, zinc, copper, cobalt, iron, magnesium, etc., as well as combinations thereof; and B is a metal cation having a valence of 3, such as chromium, iron, cobalt, aluminum, nickel, manganese, tin, gallium, titanium, vanadium, etc., as well as combinations thereof, Typically, A in the formula above provides the primary cation component of a first metal oxide cluster and B provides the primary cation component of a second metal oxide cluster. These oxide clusters may have the same or different structures. In one embodiment, for example, the first metal oxide cluster has a tetrahedral structure and the second metal oxide cluster has an octahedral cluster. Regardless, the clusters may together provide a singular identifiable crystal type structure having heightened susceptibility to electromagnetic radiation. Examples of suitable spinel crystals include, for instance, $MgAl_2O_4$, $ZnAl_2O_4$, $FeAl_2O_4$, $CuFe_2O_4$, $CuCr_2O_4$, $MnFe_2O_4$, $NiFe_2O_4$, $TiFe_2O_4$, $FeCr_2O_4$, $MgCr_2O_4$, etc. Copper chromium oxide ($CuCr_2O_4$) is particularly suitable for use in the present invention and is available from Shepherd Color Co. under the designation "Shepherd Black 1G."

When included, a laser activatable additive typically constitutes from about 0.1 wt. % to about 30 wt. %, in some embodiments from about 0.5 wt. % to about 20 wt. %, and in some embodiments, from about 1 wt. % to about 10 wt. % of the polymer composition.

The liquid crystalline polymer, fibers, and other optional additives may be melt blended together within a temperature range of from about 200° C. to about 450° C., in some embodiments, from about 220° C. to about 400° C., and in some embodiments, from about 250° C. to about 350° C. to form the polymer composition. Any of a variety of melt blending techniques may generally be employed. For example, the materials (e.g., liquid crystalline polymer, fibers, etc.) may be supplied separately or in combination to an extruder that includes at least one screw rotatably mounted and received within a barrel (e.g., cylindrical barrel) and may define a feed section and a melting section located downstream from the feed section along the length of the screw.

The extruder may be a single screw or twin screw extruder. Referring to FIG. 1, for example, one embodiment of a single screw extruder 80 is shown that contains a housing or barrel 114 and a screw 120 rotatably driven on one end by a suitable drive 124 (typically including a motor and gearbox). If desired, a twin-screw extruder may be employed that contains two separate screws. The configuration of the screw is not particularly critical to the present invention and it may contain any number and/or orientation of threads and channels as is known in the art. As shown in FIG. 1, for example, the screw 120 contains a thread that forms a generally helical channel radially extending around a core of the screw 120. A hopper 40 is located adjacent to the drive 124 for supplying the liquid crystalline polymer and/or other materials through an opening in the barrel 114 to the feed section 132. Opposite the drive 124 is the output end 144 of the extruder 80, where extruded polymer composition is output for further processing.

A feed section 132 and melt section 134 are defined along the length of the screw 120. The feed section 132 is the input portion of the barrel 114 where the liquid crystalline polymer is added. The melt section 134 is the phase change section in which the liquid crystalline polymer is changed from a solid to a liquid. While there is no precisely defined delineation of these sections when the extruder is manufactured, it is well within the ordinary skill of those in this art to reliably identify the feed section 132 and the melt section 134 in which phase change from solid to liquid is occurring. Although not necessarily required, the extruder 80 may also have a mixing section 136 that is located adjacent to the output end of the barrel 114 and downstream from the melting section 134. If desired, one or more distributive and/or dispersive mixing elements may be employed within the mixing and/or melting sections of the extruder. Suitable distributive mixers for single screw extruders may include, for instance, Saxon, Dulmage, Cavity Transfer mixers, etc. Likewise, suitable dispersive mixers may include Blister ring, Leroy/Maddock, CRD mixers, etc. As is well known in the art, the mixing may be further improved by using pins in the barrel that create a folding and reorientation of the polymer melt, such as those used in Buss Kneader extruders, Cavity Transfer mixers, and Vortex Intermeshing Pin mixers.

The fibers of the polymer composition may generally be added at any location of the extruder, such as to the hopper 40 or at a location downstream therefrom. In one particular embodiment, the fibers are added a location downstream from the point at which the liquid crystalline polymer is supplied, but yet prior to the melting section. In FIG. 1, for instance, a hopper 42 is shown that is located within a zone of the feed section 132 of the extruder 80.

Regardless of the manner in which it is formed, the melt viscosity of the resulting polymer composition is generally low enough so that it can readily flow into the cavity of a mold to form the walls of a product, e.g., a connector. For example, in one particular embodiment, the polymer composition may have a melt viscosity of from about 0.5 to about 100 Pa-s, in some embodiments from about 1 to about 80 Pa-s, and in some embodiments, from about 5 to about 50 Pa-s, determined at a shear rate of 1000 seconds$^{-1}$. Melt viscosity may be determined in accordance with ASTM Test No. 1238-70 at a temperature of 350° C.

To help achieve the desired melt viscosity, one or more functional additives may be employed as flow modifiers that interact with the liquid crystalline polymer to reduce its melt viscosity. The functional additives used as flow modifiers may be mono-, di-, trifunctional, etc., and may contain one or more reactive functional groups, such as hydroxyl, carboxyl, carboxylate, ester, and primary or secondary amines. Hydroxy-functional additives are particularly suitable flow modifiers as they contain hydroxyl functional groups that can react with the polymer chain to shorten its length and thus reduce melt viscosity. When employed, such hydroxy-functional flow modifiers typically constitute from about 0.05 wt. % to about 4 wt. % of the polymer composition. One example of such a hydroxyl-functional flow modifier is an aromatic diol, such as hydroquinone, resorcinol, 4,4'-biphenol, etc., as well as combinations thereof. Such aromatic dials may constitute from about 0.01 wt. % to about 1 wt. %, and in some embodiments, from about 0.05 wt. % to about 0.4 wt. % of the polymer composition.

Water is also a suitable hydroxyl-functional flow modifier, and can be used alone or in combination with other hydroxyl-functional flow modifiers. If desired, water can be added in a form that under process conditions generates water. For example, the water can be added as a hydrate that under the process conditions (e.g., high temperature) effectively "loses" water. Such hydrates include alumina trihydrate (ATH), copper sulfate pentahydrate, barium chloride dihydrate, calcium sulfate dihydrate, etc., as well as combinations thereof. When employed, the hydrates may constitute from about 0.02 wt. % to about 2 wt. %, and in some embodiments, from about 0.05 wt. % to about 1 wt. % of the polymer composition.

In addition to those noted above, still other functional additives may be employed as flow modifiers in the polymer composition. For instance, aromatic dicarboxylic acids can be employed that generally act to combine smaller chains of the polymer together after they have been cut by other types of functional compounds. This maintains the mechanical properties of the composition even after its melt viscosity has been reduced. Suitable aromatic dicarboxylic acids for this purpose may include, for instance, terephthalic acid, 2,6-napthalenedicarboxylic acid, isophthalic acid, 4,4'-bibenzoic acid, 2-methylterephthalic acid, etc., as well as combinations thereof. When employed, such dicarboxylic acids typically constitute from about 0.001 wt. % to about 0.5 wt. %, and in some embodiments, from about 0.005 wt. % to about 0.1 wt. % of the polymer composition.

In one embodiment, the polymer composition can employ a mixture of functional additives as flow modifier. For instance the mixture can contain a combination of an aromatic diol, hydrate, and aromatic dicarboxylic acid. A flow modifier that is a combination of functional additives can reduce melt viscosity and improve flow, but without having an adverse impact on mechanical properties. For instance, aromatic dials can constitute from about 15 wt. % to about 45 wt. % of the flow modifier mixture, hydrates can constitute from about 45 wt. % to about 75 wt. % of the flow modifier mixture, and aromatic dicarboxylic acids can constitute from about 1 wt. % to about 15 wt. % of flow modifier mixture. The flow modifier mixture can be included in the polymer composition in an amount similar to that of a single flow modifier, e.g., from about 0.001 wt. % to about 2 wt. %, from about 0.01 wt. % to about 1 wt. %, or from about 0.02 wt % to about 0.5 wt. % of the polymer composition.

Conventionally, it was believed that polymer compositions having low viscosity would not also possess sufficiently good thermal and mechanical properties to enable their use in certain types of applications. Contrary to conventional thought, however, the polymer composition having a low viscosity has been found to possess excellent mechanical properties. The composition may, for instance, possess good tensile and flexural mechanical properties. For example, the polymer composition may exhibit a flexural modulus of from about 10,000 MPa to about 30,000 MPa, in some embodiments from about 12,000 MPa to about 28,000 MPa, and in some embodiments, from about 16,000 MPa to about 25,000 MPa; a flexural strength of from about 100 to about 500 MPa, in some embodiments from about 150 to about 350 MPa, and in some embodiments, from about 175 to about 300 MPa; and/or a flexural break strain of about 0.5% or more, in some embodiments from about 0.6% to about 10%, and in some embodiments, from about 0.8% to about 3.5%. The flexural properties may be determined in accordance with ISO Test No. 178 (technically equivalent to ASTM D790) at 23° C.

The polymer composition may also exhibit a tensile strength of from about 50 to about 500 MPa, in some embodiments from about 100 to about 400 MPa, and in some embodiments, from about 125 to about 350 MPa; a tensile break strain of about 0.5% or more, in some embodiments from about 0.6% to about 10%, and in some embodiments, from about 0.8% to about 3.5%; and/or a tensile modulus of from about 10,000 MPa to about 30,000 MPa, in some embodiments from about 12,000 MPa to about 28,000 MPa, and in some embodiments, from about 15,000 MPa to about 25,000 MPa. The tensile properties may be determined in accordance with ISO Test No. 527 (technically equivalent to ASTM D638) at 23° C.

Charpy notched impact strength is greater than about 10 kJ/m2, in some embodiments from about 5 to about 40 kJ/m2, and in some embodiments, from about 6 to about 30 kJ/m2, measured at 23° C. according to ISO Test No. 179-1 (technically equivalent to ASTM D256, Method B).

The deflection temperature under load ("DTUL"), a measure of short term heat resistance, may, for instance, range from about 200° C. to about 300° C., in some embodiments from about 210° C. to about 280° C., and in some embodiments, from about 215° C. to about 260° C. Such high DTUL values can, among other things, allow the use of high speed processes often employed during the manufacture of electrical components such as connectors.

The polymer composition may be molded into a desired article using techniques as are known in the art. In one embodiment, a shaped article can be molded using an injection molding process in which dried and preheated plastic granules are injected into the mold. The resulting formed article may have any of a variety of different configurations.

Formation techniques are in no way limited to injection molding processes, however, and other formation processes, such as other melt processing formation processes, can be utilized. Suitable melt extrusion techniques may include, for instance, tubular trapped bubble film processes, flat or tube cast film processes, slit die flat cast film processes, etc. The resulting shaped article may have a variety of different forms, such as sheets, films, tubes, etc.

In one embodiment, the polymer composition can be shaped to form an article that is thin in nature and can, for instance, have a thickness of about 10 millimeters or less, in some embodiments from about 0.01 to about 8 millimeters, in some embodiments from about 0.05 to about 6 millimeters, and in some embodiments, from about 0.1 to about 2 millimeters.

Metallized conductive elements may be formed on a shaped article using a laser direct structuring process ("LDS"). Activation with a laser causes a physio-chemical reaction in which spinel crystals included as an additive in the polymer composition are cracked open to release metal atoms. These metal atoms can act as a nuclei for metallization (e.g., reductive copper coating). The laser also creates a microscopically irregular surface and ablates the polymer matrix, creating numerous microscopic pits and undercuts in which the metal can be anchored during metallization.

In one embodiment, the polymer composition can be utilized in forming an article that has previously required the utilization of a metal structural material for strength. For instance, the polymeric composition can be utilized in formation of metallized components for automobiles, trucks, commercial airplanes, aerospace, rail, household appliances, computer hardware, hand held devices, recreation and sports, structural component for machines, structural components for buildings, etc. Suitable electronic device may include, for instance, wireless devices, capacitors (e.g., as a cap for the capacitor), electrical connectors, processors, etc.

Wireless electronic devices are particularly suitable for incorporation of articles formed of the polymer composition. For example, a molded article formed by the polymer composition may serve as a housing for a wireless electronic device. In such embodiments, a component of the wireless electronic device such as the antenna may be disposed on and/or within the polymer composition during the molding process. Other discrete components can also be embedded within the polymer composition, such as metal stampings, bushings, electromechanical parts, filtration materials, metal reinforcement and other discrete parts that are combined into a single unitary device through the injection of the polymer composition around the carefully placed parts.

Examples of suitable wireless electronic devices may include a desktop computer or other computer equipment, a portable electronic device, such as a laptop computer or small portable computer of the type that is sometimes referred to as "ultraportables." In one suitable arrangement, the portable electronic device may be a handheld electronic device. Examples of portable and handheld electronic devices may include cellular telephones, media players with wireless communications capabilities, handheld computers (also sometimes called personal digital assistants), remote controls, global positioning system ("GPS") devices, and handheld gaming devices. The device may also be a hybrid device that combines the functionality of multiple conventional devices. Examples of hybrid devices include a cellular telephone that includes media player functionality, a gaming device that includes a wireless communications capability, a cellular telephone that includes game and email functions, and a handheld device that receives email, supports mobile telephone calls, has music player functionality and supports web browsing.

Figure 2:
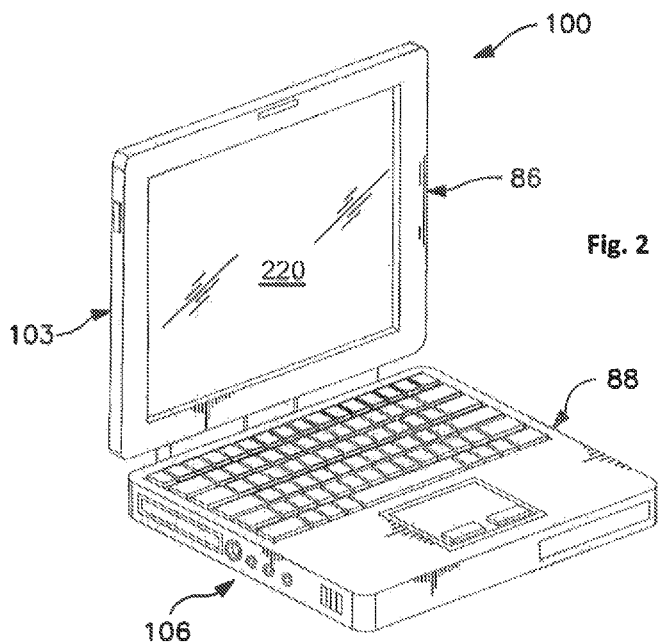
FIG. 2 is a perspective view of one embodiment of a portable electronic device that can be formed in accordance with the present disclosure.
Figure 3:
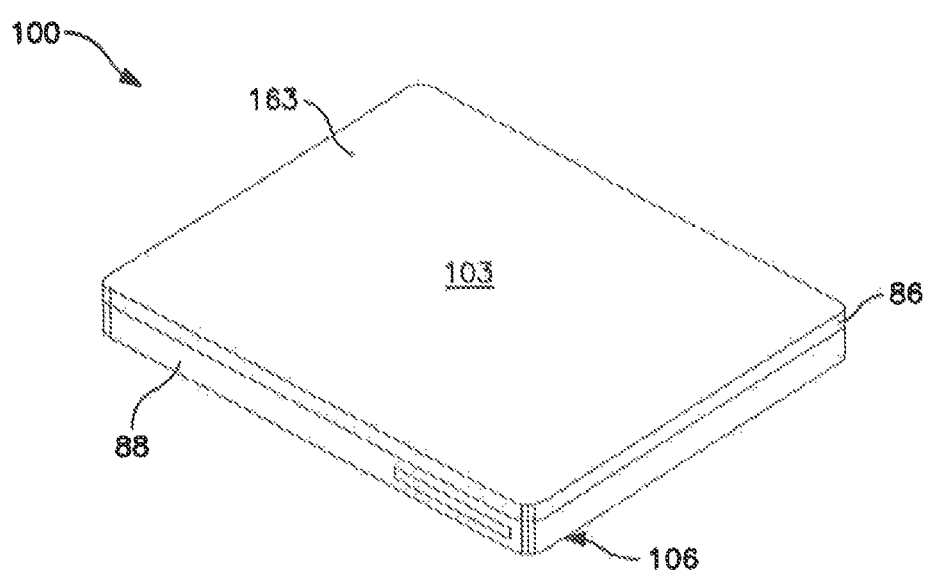
FIG. 3 is a perspective view of the portable electronic device of FIG. 2, shown in a closed configuration.

Referring to FIGS. 2-3, one particular embodiment of a wireless electronic device 100 is shown as a laptop computer, The electronic device 100 includes a display member 103 rotatably coupled to a base member 106. The display member 103 may be a liquid crystal diode (LCD) display, an organic light emitting diode (OLED) display, a plasma display, or any other suitable display. The display member 103 and the base member 106 each contain a housing 86 and 88, respectiveiy, for protecting and/or supporting one or more components of the electronic device 100. The housing 86 may, for example, support a display screen 220 and the base member 106 may include cavities and interfaces for various user interface components (e.g. keyboard, mouse, and connections to other peripheral devices).

The polymer composition may be employed to form any portion of the electronic device 100. In most embodiments, however, the polymer composition is employed to form all or a portion of the housing 86 and/or 88. For example, the housing 86 shown in FIG. 2 is formed from the polymer composition. The exterior surface 163 of the housing 86 can be seen in FIG. 3. The exterior surface 163 is generally smooth, and can include any desired color and visual appearance.

Although not expressly shown, the device 100 may also contain circuitry as is known in the art, such as storage, processing circuitry, and input-output components. Wireless transceiver circuitry may be used to transmit and receive radio-frequency (RF) signals. Communications paths such as coaxial communications paths and microstrip communications paths may be used to convey radio-frequency signals between transceiver circuitry and antenna structures. A communications path may be used to convey signals between the antenna structure and circuitry. The communications path may be, for example, a coaxial cable that is connected between an RF transceiver (sometimes called a radio) and a multiband antenna.

Figure 4:
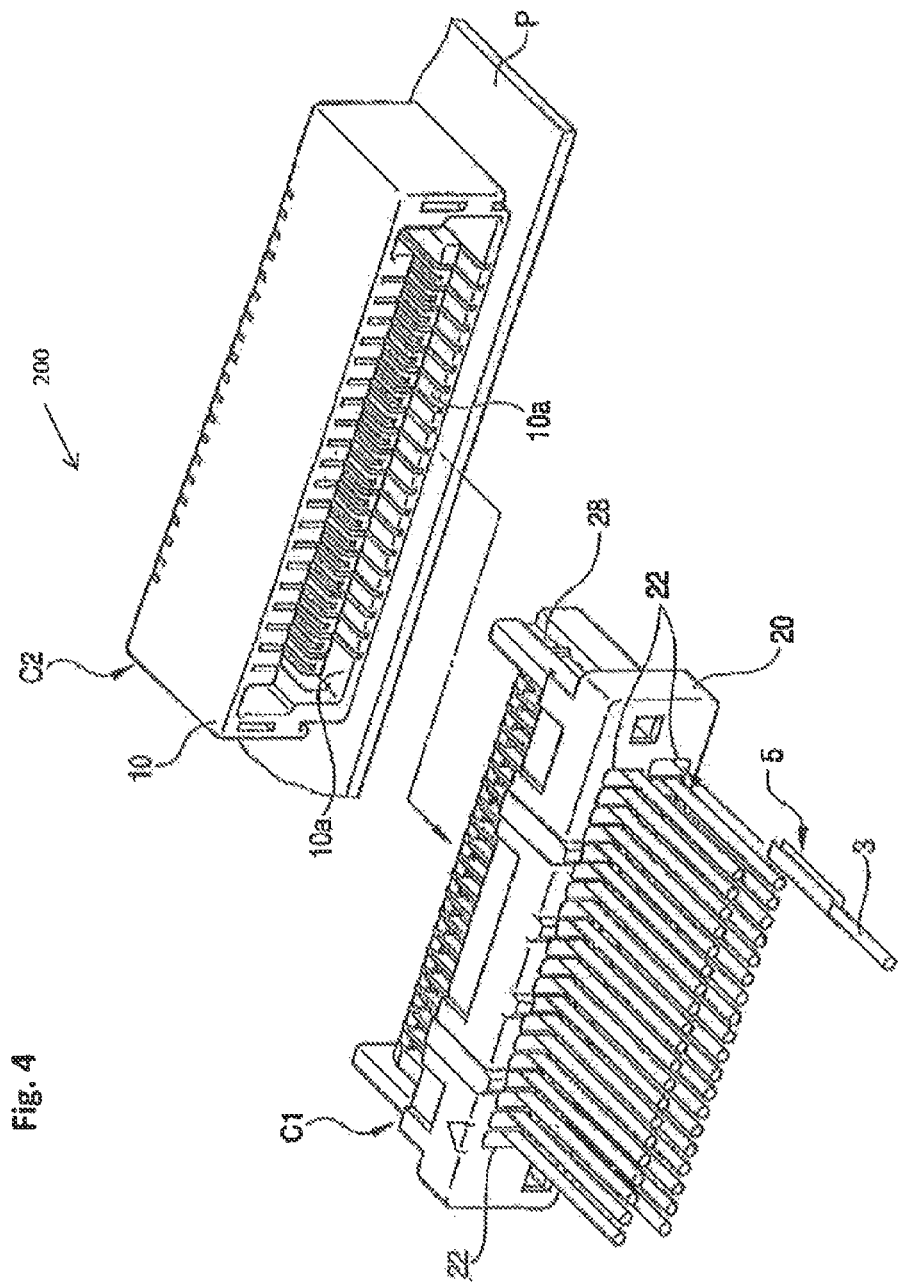
FIG. 4 is an exploded perspective view of one embodiment of an electrical connector that may be formed according to the present disclosure.

Another example of an electronic device that may be formed form the polymer composition is a connector, a representative example of which is shown in FIG. 4. An electrical connector 200 is shown including a board-side portion C2 that can be mounted onto the surface of a circuit board P. The connector 200 may also include a wiring material-side portion C1 structured to connect discrete wires 3 to the circuit board P by being coupled to the board-side connector C2. The board-side portion C2 may include a first housing 10 that has a fitting recess 10a into which the wiring material-side connector C1 is fitted and a configuration that is slim and long in the widthwise direction of the housing 10. The wiring material-side portion C1 may likewise include a second housing 20 that is slim and long in the widthwise direction of the housing 20. In the second housing 20, a plurality of terminal-receiving cavities 22 may be provided in parallel in the widthwise direction so as to create a two-tier array including upper and lower terminal-receiving cavities 22. A terminal 5, which is mounted to the distal end of a discrete wire 3, may be received within each of the terminal-receiving cavities 22. If desired, locking portions 28 (engaging portions) may also be provided on the housing 20 that correspond to a connection member (not shown) on the board-side connector C2.

Figure 5:
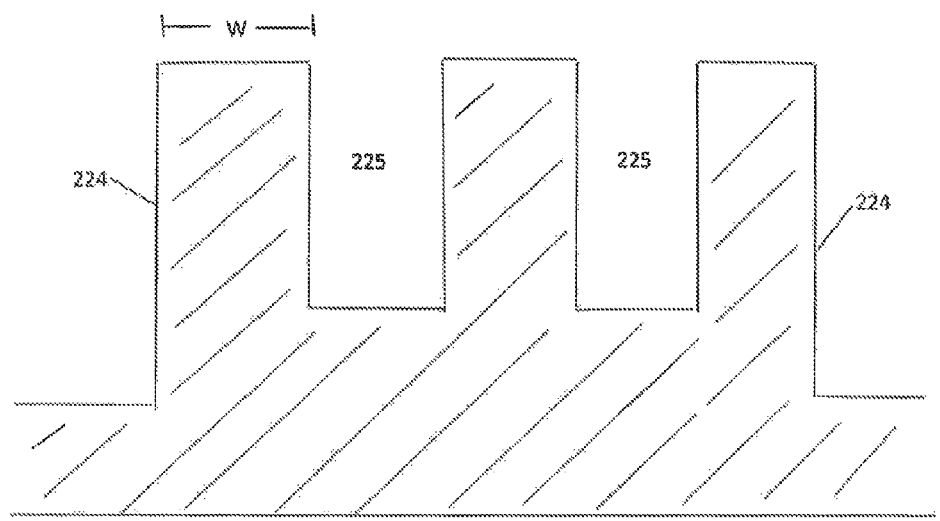
FIG. 5 is a front view of opposing walls of the fine pitch electrical connector of FIG. 4.

The interior walls of the first housing 10 and/or second housing 20 may have a relatively small width dimension, and can be formed from the polymer composition of the present invention. The walls are, for example, shown in more detail in FIG. 5. As illustrated, insertion passageways or spaces 225 are defined between opposing walls 224 that can accommodate contact pins. The walls 224 have a width "w".

In addition to or in lieu of the walls, it should also be understood that any other portion of the connector may also be formed from the polymer composition. For example, the connector may also include a shield that encloses the housing. Some or all of the shield may be formed from the polymer composition of the present invention. For example, the housing and the shield can each be a one-piece structure unitarily molded from the polymer composition. Likewise, the shield can be a two-piece structure that includes a first shell and a second shell, each of which may be formed from the polymer composition of the present invention.

The present invention may be better understood with reference to the following examples.

Formation and Test Methods

Injection Molding: Tensile bars are injection molded to ISO 527-1 specifications according to standard ISO conditions. Temperatures are 313° C., 316° C., 321° C. and 317° C. (rear to nozzle) with a mold temperature of 135° C. and an injection speed of 275 mm/s.

Melt Viscosity: The melt viscosity (Pa-s) was determined in accordance with ISO Test No. 11443 at 350° C. and at a shear rate of 400 $s^{-1}$ and 1000 $s^{-1}$ using a Dynisco 7001 capillary rheometer. The rheometer orifice (die) had a diameter of 1 mm, length of 20 mm, L/D ratio of 20.1, and an entrance angle of 180°. The diameter of the barrel was 9.55 mm±0.005 mm and the length of the rod was 233.4 mm.

Deflection Temperature Under Load ("DTUL"): The deflection under load temperature was determined in accordance with ISO Test No. 75-2 (technically equivalent to ASTM D648-07). More particularly, a test strip sample having a length of 80 mm, thickness of 10 mm, and width of 4 mm was subjected to an edgewise three-point bending test in which the specified load (maximum outer fibers stress) was 1.8 megaPascals. The specimen was lowered into a silicone oil bath where the temperature is raised at 2° C. per minute until it deflects 0.25 mm (0.32 mm for ISO Test No. 75-2).

Tensile Properties: Tensile properties are tested according to ISO Test No. 527 (technically equivalent to ASTM D638). Modulus and strength measurements are made on the same test strip sample having a length of 80 mm, thickness of 10 mm, and width of 4 mm. The testing temperature is 23° C., and the testing speeds are 1 or 5 mm/min.

Flexural Properties: Flexural properties are tested according to ISO Test No. 178 (technically equivalent to ASTM D790). This test is performed on a 64 mm support span. Tests are run on the center portions of uncut ISO 3167 multi-purpose bars. The testing temperature is 23° C. and the testing speed is 2 mm/min.

Notched Charpy Impact Strength: Notched Charpy properties are tested according to ISO Test No. ISO 179-1 (technically equivalent to ASTM D256, Method B). This test is run using a Type A notch (0.25 mm base radius) and Type 1 specimen size (length of 80 mm, width of 10 mm, and thickness of 4 mm). Specimens are cut from the center of a multi-purpose bar using a single tooth milling machine. The testing temperature is 23° C.

Unnotched Charpy Impact Strength: Unnotched Charpy properties were tested according to ISO Test No. 180 at 23° C. (technically equivalent to ASTM D256). The test is run using a Type 1 specimen (length of 80 mm, width of 10 mm and thickness of 4 mm). Specimens are cut from the center of a multi-purpose bar using a single tooth milling machine. The testing temperature is 23° C.

Density: Density was determined according to ISO Test No. 1183 (technically equivalent to ASTM D792). The specimen was weighed in air then weighed when immersed in distilled water at 23° C. using a sinker and wire to hold the specimen completely submerged as required.

Blister Free Temperature: To test blister resistance, a 127×12.7×0.8 mm test bar is molded at 5° C. to 10° C. higher than the melting temperature of the polymer resin, as determined by DSC. Ten (10) bars are immersed in a silicone oil at a given temperature for 3 minutes, subsequently removed, cooled to ambient conditions, and then inspected for blisters (i.e., surface deformations) that may have formed. The test temperature of the silicone oil begins at 250° C. and is increased at 10° C. increments until a blister is observed on one or more of the test bars. The "blister free temperature" for a tested material is defined as the highest temperature at which all ten (10) bars tested exhibit no blisters. A higher blister free temperature suggests a higher degree of heat resistance.

Warpage-LGA: The warpage is determined by first forming an injection molded line grid array ("LGA") connector (size of 49 mm×39 mm×1 mm) from a polymer composition sample. A Cores' coplanarity measuring module, model core9037a, is used to measure the degree of warpage of the molded part. The test is performed; connector as molded (unaged), and conditioned in 20 minute temperature cycle that ramps from ambient temperature to 270° C., is maintained for 3 minutes and ramped back to room temperature (aged).

EXAMPLE 1

A 2 liter flask was charged with HBA (538.7 g), TA (162 g), BP (145.2 g), IA (54 g), HQ (57.3 g) and 50 mg of potassium acetate. The flask next was equipped with C-shaped stirrer, a thermocouple, a gas inlet, and distillation head. The flask was placed under a low nitrogen purge and acetic anhydride (99.7% assay, 686 g) was added. The milky-white slurry was agitated at 75 rpm and heated to 140° C. over the course of 95 minutes using a fluidized sand bath. After this time, the mixture was then gradually heated to 360° C. steadily over 300 minutes. Reflux was seen once the reaction exceeded 140° C. and the overhead temperature increased to approximately 115° C. as acetic acid byproduct was removed from the system. During the heating, the mixture grew yellow and slightly more viscous and the vapor temperature gradually dropped to 90° C. Once the mixture had reached 360° C., the nitrogen flow was stopped. The flask was evacuated below 20 psi and the agitation slowed to 30 rpm over the course of 45 minutes. As the time under vacuum progressed, the mixture grew viscous. After 63 minutes, in the final vacuum step, torque (20 in/oz) was recorded as seen by the strain on the agitator motor. The reaction was then stopped by releasing the vacuum and stopping the heat flow to the reactor. The flask was cooled and then polymer was recovered as a solid, dense yellow-brown plug. Sample for analytical testing was obtained by mechanical size reduction.

Thermal Behavior (DSC Second Cycle)
$T_m$=326.5° C.
$T_c$=285.5° C.
Melt Viscosity (Scanning Shear, 350° C.)
MV (1000 $s^{-1}$)=85 Pa-s
MV (400 $s^{-1}$)=137 Pa-s

EXAMPLE 2

A 2 liter flask was charged with HBA (547 g), TA (139.8 g), BP (150.6 g), IA (79.5 g), HQ (56.3 g) and 20 mg of potassium acetate. The flask next was equipped with C-shaped stirrer, a thermocouple, a gas inlet, and distillation head. The flask was placed under a low nitrogen purge and acetic anhydride (99.7% assay, 692.7 g) was added. The milky-white slurry was agitated at 75 rpm and heated to 140° C. over the course of 95 minutes using a fluidized sand bath. After this time, the mixture was then gradually heated to 350° C. steadily over 300 minutes. Reflux was seen once the reaction exceeded 140° C. and the overhead temperature increased to approximately 115° C. as acetic acid byproduct was removed from the system. During the heating, the mixture grew yellow and slightly more viscous and the vapor temperature gradually dropped to 90° C. Once the mixture had reached 350° C., the nitrogen flow was stopped. The flask was evacuated below 20 psi and the agitation slowed to 30 rpm over the course of 45 minutes. As the time under vacuum progressed, the mixture grew viscous. After 33 minutes, in the final vacuum step, torque (20 in/oz) was recorded as seen by the strain on the agitator motor, The reaction was then stopped by releasing the vacuum and stopping the heat flow to the reactor. The flask was cooled and then polymer was recovered as a solid, dense yellow-brown plug. Sample for analytical testing was obtained by mechanical size reduction.

EXAMPLE 3

Compositions were formed with liquid crystalline polymers as described herein. The non-HNA liquid crystal polymer (LCP) formulation may be formed as described in Example 1 or Example 2, above. The LCP including HND can be formed according to standard technologies such as described herein. Formulation materials included cut glass fibers (13 micron, 4 mm cut length OCV® available from Owens Corning) and a lubricant (commercial grade pentaerythritol tetrastearate Glycolube® P available from Lonza, Inc. of Allendale, N.J.). To form the compositions, the polymers were dried for 4 hours following formation at 275° C. prior to compounding. All raw materials were added to a co-rotating, twin screw extruder (70 mm diameter, 32 LAD) with the glass fiber addition point being downstream of the resin addition point. Process conditions were set for each system based on the polymer melt point, viscosity, etc. Compounded material was stranded using a water bath and pelletized. Resultant pellets were dried overnight at 130° C. and injection molded as described for testing.

Formulations of each sample are described in Table 1, below. Values are provided as weight percentage.

TABLE 1

|  | Sample 1 | Sample 2 |
|---|---|---|
| LCP including HNA | 64.7 | — |
| LCP - non-HNA | — | 64.7 |
| Glass fiber | 35 | 35 |
| Lubricant | 0.3 | 0.3 |
| Total | 100 | 100 |

The testing results for the samples are provided in Table 2, below. It is clear that by utilization of the resin with no naphthenic acid derivatives there is a 23.8% improvement in tensile modulus and a 19% improvement in flexural modulus.

TABLE 2

|  | Sample 1 | Sample 2 |
|---|---|---|
| Density (kg/m$^3$) | 1670 | 1670 |
| Tensile Modulus (1 mm/s; MPa) | 16000 | 21000 |
| Tensile Strength (5 mm/s; MPa) | 150 | 155 |
| Flexural Modulus (23° C.; MPa) | 17000 | 21000 |
| Flexural Strength (23° C.; MPa) | 225 | 225 |
| Flexural strain at break (%) | 2.1 | 1.7 |

EXAMPLE 4

Liquid crystalline polymers and compositions were formed with the compositions including an increased amount of glass fibers. The non-HNA liquid crystal polymer (LCP) formulation may be formed as described in Example 1 or Example 2, above. Formulations and testing results are provided in Table 3, below. As can be seen, with increase of the glass fiber loading, there was an approximately 19.9 MPa increase in tensile modulus and about 17.4 increase in flexural modulus for the naphthenic acid-free liquid crystalline polymer as compared to the comparative polymer. This further supports the understanding that the increase in modulus is due to the lack of naphthenic acid in the liquid crystalline polymer.

TABLE 3

|  | Sample 3 | Sample 4 |
|---|---|---|
| LCP including HNA | 49.7 | — |
| LCP - non-HNA | — | 49.7 |
| Glass fiber | 50.0 | 50.0 |
| Lubricant | 0.3 | 0.3 |
| Total | 100.0 | 100.0 |
| Melt Viscosity (1,000 sec$^{-1}$ at 350° C.; Pa-s) | 52.9 | 60.0 |
| Melt Viscosity (400 sec$^{-1}$ at 350° C.; Pa-s) | 79.6 | 89.4 |
| Tensile Modulus (1 mm/s; MPa) | 20111 ± 535 | 24122 ± 153 |
| Tensile Strength (5 mm/s; MPa) | 122.5 ± 8.4 | 133.7 ± 7.0 |
| Tensile Strain at break (%) | 0.9 ± 0.2 | 0.7 ± 0.1 |
| DTUL (° C.) | 263.9 ± 1.1 | 253.9 ± 0.3 |
| Flexural Modulus (23° C.; MPa) | 20714 ± 350.7 | 24327 ± 232.8 |
| Flexural Strength (23° C.) | 195.3 ± 8.7 | 193.2 ± 4.4 |
| Flexural strain at break (%) | 1.5 ± 0.1 | 1.1 ± 0.0 |
| Charpy Unnotched Impact Strength (kJ/m$^2$) | 23.1 ± 3.5 | 19.4 ± 2.8 |
| Charpy Notched Impact Strength (kJ/m$^2$) | 14.5 ± 1.3 | 12.7 ± 2.2 |

EXAMPLE 4

Compositions were formed using milled glass fibers as additive with liquid crystal polymers. The non-HNA liquid crystal polymer (LOP) formulation may be formed as described in Example 1 or Example 2, above. Glass fiber additives were as follows:

Glass fibers (1)—11 micron diameter and 50 micron average length (PF 70E-01 available from Nitto Boseki Co., Ltd.)

Glass fibers (2)—13±1.5 micron diameter and 70 micron average length (OCV® Rev 4 available from Owens Corning)

To form the composition, the polymers were dried overnight at 275° following formation prior to compounding. All raw materials were added to a co-rotating, twin screw extruder (25 mm diameter or 32 mm diameter) with the milled glass fiber addition point being downstream of the resin addition point. Process conditions were set for each system based on polymer melt point, viscosity, etc. Compounded material was stranded using a water bath and pelletized. Resultant pellets were dried overnight at 130° C. and injection molded as described above. Formulations and testing results are presented in Table 4, below.

TABLE 4

|  | Sample 5 | Sample 6 | Sample 7 |
|---|---|---|---|
| LCP including HNA | 69.7 | 69.7 | — |
| LCP - non-HNA | — | — | 69.7 |
| Glass fibers (1) | 30 | — | — |
| Glass fibers (2) | — | 30 | 30 |
| Lubricant | 0.3 | 0.3 | 0.3 |
| Total | 100 | 100 | 100 |
| Blister Free Temperature (° C.) | 270 | 260 | 290 |
| Melt Viscosity (1,000 sec$^{-1}$ at 350° C.; Pa-s) | 22.2 | 21.7 | 24.3 |
| Melt Viscosity (400 sec$^{-1}$ at 350° C.; Pa-s) | 29 | 28.4 | 30.2 |
| Tensile Modulus (1 mm/s; MPa) | 12255 ± 79.0 | 11111 ± 72.1 | 16244 ± 106.7 |

TABLE 4-continued

|  | Sample 5 | Sample 6 | Sample 7 |
|---|---|---|---|
| Tensile Strength (5 mm/s; MPa) | 160 ± 12.1 | 158 ± 1.4 | 168 ± 2.5 |
| Tensile Strain at break (%) | 3.13 ± 0.47 | 3.69 ± 0.08 | 1.94 ± 0.04 |
| DTUL (° C.) | 239.0 ± 1.1 | 240.1 ± 1.7 | 226.7 ± 0.6 |
| Flexural Modulus (23° C.; MPa) | 12993 ± 101 | 12184 ± 72 | 16605 ± 40 |
| Flexural Strength (23° C.; MPa) | * | * | 178 ± 1.0 |
| Flexural strain at break (%) | * | * | 2.7 ± 0.040 |
| Charpy Notched Impact Strength (kJ/m$^2$) | 62.4 ± 7.6 | 58.5 ± 9.7 | 27.7 ± 3.9 |
| LGA Peak Mesh Load (lb$_f$) | 9.3 ± 0.13 | 9.1 ± 0.59 | 8.6 ± 0.36 |
| LGA Warpage (as molded) (mm) | 1.010 ± 0.06 | 1.055 ± 0.11 | 0.843 ± 0.12 |
| LGA Warpage (post reflow) (mm) | 3.038 ± 0.152 | 3.185 ± 0.287 | 3.072 ± 0.224 |
| Peak Injection Pressure - LGA (psi) | 5388 | 5457 | 4983 |
| Flatness as molded (mm) | 0.0027 | — | 0.0018 |
| Flatness post-simulated (mm) | 0.0018 | — | 0.0015 |

* Indicates that the sample did not break during the flexural bend. It reached 3.5% strain without indicating failure.

As can be seen the utilization of the milled glass fibers with the non-HNA liquid crystalline polymers provided for a significant increase in tensile and flexural modulus relative to the comparison sample.

EXAMPLE 5

Materials and methods as described were utilized to form liquid crystalline polymer compositions. The compositions were then used to form injection molded testing bars as described above. Formulations and testing results are summarized in Table 5, below.

TABLE 5

|  | Sample 8 | Sample 9 | Sample 10 |
|---|---|---|---|
| LCP including HNA | 59.7 | 59.7 | — |
| LCP - non-HNA | — | — | 59.7 |
| Glass fibers (1) | 40 | — | — |
| Glass fibers (2) | — | 40 | 40 |
| Lubricant | 0.3 | 0.3 | 0.3 |
| Total | 100 | 100 | 100 |
| Melt Viscosity (1,000 sec$^{-1}$ 350° C.; Pa-s) | 49.4 | 45.3 | 39.6 |
| Melt Viscosity (400 sec$^{-1}$ at 350° C.; Pa-s) | 72.7 | 63.9 | 54.3 |
| Tensile Modulus (1 mm/s; MPa) | 13767 ± 59.0 | 11293 ± 65.4 | 18745 ± 96.8 |
| Tensile Stress (5 mm/s; MPa) | 147 ± 4.1 | 131 ± 4.0 | 153 ± 3.2 |
| Tensile Strength (%) | 2.852 ± 0.2 | 2.98 ± 1.0 | 1.438 ± 0.1 |
| DTUL (° C.) | 254 ± 2.1 | 241 ± 3.0 | 242 ± 1.1 |
| Flexural Modulus (23° C.; MPa) | 14911 ± 292.0 | 12742 ± 61.7 | 19395 ± 87.0 |
| Flexural Strength (23° C.) (MPa) | 181 ± 2.3 | 156 ± 1.0 | 190 ± 2.6 |
| Flexural strain at break (%) | 2.80 ± 0.10 | 3.33 ± 0.10 | 1.88 ± 0.08 |
| Charpy Notched Impact Strength (kJ/m$^2$) | 39.1 ± 5.0 | 33.2 ± 4.2 | 18.4 ± 1.5 |

As can be seen the utilization of the milled glass fibers with the non-HNA liquid crystalline polymers provided for a significant increase in tensile and flexural modulus relative to the comparison sample.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A thermotropic liquid crystalline polymer composition that comprises a melt-polymerized, wholly aromatic liquid crystalline polymer and a fibrous filler, wherein the total amount of repeating units in the liquid crystalline polymer derived from naphthenic acids is no more than about 5 mol. %, wherein the liquid crystalline polymer comprises repeating units derived from isophthalic acid, hydroquinone, and at least one hydroxycarboxylic acid and wherein the polymer composition has a flexural modulus of greater than about 10,000 megaPascals as determined in accordance with ISO Test No. 178 at 23° C.

2. The thermotropic liquid crystalline polymer composition of claim 1, wherein the ratio of repeating units derived from isophthalic acid to repeating units derived from hydroquinone is from about 1:2 to about 2:1.

3. The thermotropic liquid crystalline polymer composition of claim 1, wherein the liquid crystalline polymer is an aromatic polyester.

4. The thermotropic liquid crystalline polymer composition of claim 1, wherein the liquid crystalline polymer further comprises repeating units derived from N-acetyl-4-aminophenyl.

5. The thermotropic liquid crystalline polymer composition of claim 1, wherein the repeating units derived from hydroquinone constitute from about 1 mol. % to about 25 mol. % of the liquid crystalline polymer.

6. The thermotropic liquid crystalline polymer composition of claim 1, wherein the repeating units derived from isophthalic acid constitute from about 1 mol. % to about 30 mol. % of the liquid crystalline polymer.

7. The thermotropic liquid crystalline polymer composition of claim 1, wherein the hydroxycarboxylic acid is 4-hydroxybenzoic acid.

8. The thermotropic liquid crystalline polymer composition of claim 1, wherein the liquid crystalline polymer further comprises repeating units derived from terephthalic acid.

9. The thermotropic liquid crystalline polymer composition of claim 1, wherein the liquid crystalline polymer further comprises repeating units derived from 4,4'-dihydroxybiphenyl.

10. The thermotropic liquid crystalline polymer composition of claim 1, wherein the liquid crystalline polymer contains from about 1 mol. % to about 5 mol. % monomer units derived from isophthalic acid, from about 1 mol. % to about 5 mol. % monomer units derived from hydroquinone, from about 30 mol. % to about 90 mol. % monomer units derived from 4-hydroxybenzoic acid, from about 5 mol. % to about 50 mol. % monomer units derived from terephthalic acid, from about 1 mol. % to about 20 mol. % monomer units derived from 4,4'-hydroxybiphenyl, and from about 2 mol. % to about 15 mol. % monomer units derived from N-acetyl-4-aminophenyl.

11. The thermotropic liquid crystalline polymer composition of claim 1, wherein the total amount of repeating units in the polymer derived from naphthenic acids is no more than about 2 mol. %.

12. The thermotropic liquid crystalline polymer composition of claim 1, wherein the liquid crystalline polymer is free of units derived from naphthenic hydroxycarboxylic acids.

13. The thermotropic liquid crystalline polymer composition of claim 1, wherein the liquid crystalline polymer is free of units derived from naphthenic acids.

14. The thermotropic liquid crystalline polymer composition of claim 1, wherein the fibrous filler comprises glass fibers.

15. The thermotropic liquid crystalline polymer composition of claim 14, wherein the glass fibers comprise chopped glass fibers.

16. The thermotropic liquid crystalline polymer composition of claim 14, wherein the glass fibers comprise milled glass fibers.

17. The thermotropic liquid crystalline polymer composition of claim 1, further comprising a mineral filler, a lubricant, a laser activatable additive, or a flow modifier.

18. The thermotropic liquid crystalline polymer composition of claim 1, wherein the polymer composition has a flexural strength of greater than about 225 megaPascals as determined in accordance with ISO Test No. 178 at 23° C.

19. The thermotropic liquid crystalline polymer composition of claim 1, wherein the polymer composition has a tensile strength of greater than about 150 megaPascals as determined in accordance with ISO Test No. 527 at 23° C.

20. The thermotropic liquid crystalline polymer composition of claim 1, wherein the polymer composition has a tensile modulus of greater than about 15,000 megaPascals as determined in accordance with ISO Test No. 527 at 23° C.

21. The thermotropic liquid crystalline polymer composition of claim 1, wherein the polymer composition has a notched Charpy impact strength of greater than about 30 $kJ/m^2$ as determined in accordance with ISO Test No. 179-1 at 23° C.

22. The thermotropic liquid crystalline polymer composition of claim 1, wherein the polymer composition has a deflection temperature under load of greater than about 260° C. as determined in accordance with ISO Test No. 75-2 at a specified load of 1.8 megaPascals.

23. An injection molded article formed of the liquid crystalline polymer composition of claim 1.

24. A wireless electronic device comprising the liquid crystalline polymer composition of claim 1.

25. A laptop computer comprising the liquid crystalline polymer composition of claim 1.

26. An electrical connector comprising the liquid crystalline polymer composition of claim 1.

27. A metallized conductive element comprising the liquid crystalline polymer composition of claim 1.

* * * * *